United States Patent
Cataudella et al.

(12) 
(10) Patent No.: US 6,456,296 B1
(45) Date of Patent: Sep. 24, 2002

(54) COLOR SCHEME FOR ZOOMING GRAPHICAL USER INTERFACE

(75) Inventors: Salvatore Cataudella, Brooklyn; Kathleen Cunningham, New York; Kenneth Herndon, Suffern, all of NY (US)

(73) Assignees: Sony Corporation (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/321,654

(22) Filed: May 28, 1999

(51) Int. Cl.[7] .................................................. G06F 3/00
(52) U.S. Cl. ...................... 345/619; 345/589; 345/593; 345/835
(58) Field of Search ................................. 345/835, 853, 345/589, 593, 440, 619, 841, 595

(56) References Cited

U.S. PATENT DOCUMENTS

| | | |
|---|---|---|
| 5,341,466 A | 8/1994 | Perlin et al. |
| 5,596,346 A | 1/1997 | Leone et al. |
| 5,596,690 A | 1/1997 | Stone et al. |
| 5,615,384 A | 3/1997 | Allard et al. |
| 5,617,114 A | 4/1997 | Bier et al. |
| 5,732,230 A | 3/1998 | Cullen et al. |
| 5,784,061 A * | 7/1998 | Moran et al. ............... 345/863 |
| 5,946,419 A * | 8/1999 | Chen et al. ................. 382/243 |
| 6,232,984 B1 * | 5/2001 | Chuah et al. ............... 345/441 |
| 6,249,290 B1 * | 6/2001 | Herdon et al. .............. 345/439 |
| 6,275,228 B1 * | 8/2001 | Cataudella .................. 345/764 |
| 6,275,232 B1 * | 8/2001 | Cataudella et al. ......... 345/839 |
| 6,278,462 B1 * | 8/2001 | Weil et al. .................. 345/433 |

* cited by examiner

Primary Examiner—Raymond J. Bayerl
Assistant Examiner—Cuong T. Thai
(74) Attorney, Agent, or Firm—Lerner, David, Littenberg, Krumholz & Mentlik, LLP (57) ABSTRACT

An object oriented zooming engine provides zooming graphical objects for a zooming graphical user interface. A zooming object residing in a zooming graphical user interface has attributes that are defined by graphical object classes having a particular class hierarchy. Color scheme object classes have a hierarchy that mirrors that of the graphical object classes. This provides an architecture wherein classes of zooming objects can have their own default color schemes, and can inherit the default characteristics of super classes in a predictable fashion. Thus, for example, an instance of an object may inherit the color attributes of other members of its class by default, or may specify an instance color scheme that differs from the default scheme. The architecture provides consistent encapsulation of the color attributes corresponding to graphical objects, and allows color information for the graphical user interface to be stored more efficiently.

15 Claims, 9 Drawing Sheets

COLOR SCHEME FOR ZOOMING GRAPHICAL USER INTERFACE

CROSS REFERENCE TO RELATED APPLICATIONS

This application is related to U.S. patent application Ser. No. 09/211,666, entitled Polymorphic Event Handling for Zooming Graphical User Interface, filed Dec. 14, 1998; U.S. patent application Ser. No. 09/211,280, entitled Interchangeable Pick Handler for Zooming Graphical User Interface, filed Dec. 14, 1998; U.S. patent application Ser. No. 09/211,669, entitled Object Oriented Zooming Graphical User Interface, filed Dec. 14, 1998; U.S. patent application Ser. No. 09/223,934, entitled Click-Through Pick Method For Group Objects In A Zooming Graphical Interface, filed Dec. 31, 1998; U.S. patent application Ser. No. 09/239,652, entitled System and Method for Providing Zooming Video, filed Jan. 29, 1999; U.S. patent application Ser. No. 09/240,905, entitled Singleton/Universe Based Zooming Space for Graphical User Interface, filed Jan. 29, 1999; U.S. patent application Ser. No. 09/240,416, entitled Zooming Space Grid for Graphical User Interface, filed Jan. 29, 1999; U.S. patent application Ser. No. 09/245,205, entitled Apparatus and Method for Cropping an Image in a Zooming Graphical User Interface, filed Feb. 5, 1999; and U.S. patent application Ser. No. 09/261,529, entitled System and Method for Providing Video Capture, filed Mar. 3, 1999.

FIELD OF THE INVENTION

This invention relates generally to graphical user interfaces and more particularly to providing colors for objects in a graphical user interface.

BACKGROUND OF THE INVENTION

The available display screen area on a computer monitor has become increasingly inadequate in terms of the presentation of the variety of information and resources available to the user. In this regard, conventional computing systems have attempted to provide various solutions to address the problem of limited display screen area.

For example, windowing systems divide a screen into multiple tiled or overlapping display areas, resembling sheets of paper on a desktop, with one window in the foreground and others in the background. These windows remind the user that other information and control options are readily available to be brought to the foreground at the click of a mouse on an unobscured point in the window containing the desired material. However, such systems typically allow only a limited number of windows to be open and only the foreground window to be operable at any one time. In addition, information within a window that does not fit on the window's display screen area must be scrolled using an input device in order to access chosen information.

Another attempt to increase displayed information and control options is the use of hierarchical menuing through a sequence of display screens, offered to the user as a cascade of windows or a single designated screen area overwritten for each submenu. Typically, hierarchical menus rely upon information organized into decision trees. Abbreviating menuing options causes the menus to be less user friendly as menus do not always suggest sub-menu options. Further, cascaded windows introduce screen clutter and prevent the user from seeing all of the cascaded information simultaneously.

Zooming graphical user interfaces allow navigation into or out of the display screen, and can thus allow zooming graphical objects to be viewed from various perspectives at various levels of granularity. This provides the ability to view large numbers of objects at low resolution (e.g., by zooming away from them), or smaller numbers of objects at higher resolution (e.g., by zooming towards them). Thus, the user can review available resources from a broad perspective, and then focus with greater detail on particular resources.

In conventional zooming graphical user interfaces, each graphical object might have a foreground color and a background color, with additional colors potentially being added to object subclasses as necessary (e.g., fill color). In these schemes, colors are not encapsulated in a consistent manner. Also, no attempt is made to reduce the memory usage of all the color instantiations. Finally, there is no easy way to change the colors of all instances of a particular class (e.g., in order to customize appearance).

SUMMARY OF THE INVENTION

Conventional zooming graphical user interfaces are typically static hard-coded systems, which are inflexible in various aspects, suffering from limited and inefficient capabilities while lacking portability and modularity. What is needed is a graphical user interface with architecture having improved flexibility, and more efficient functionality. Further needed is a scheme for associating colors with graphical objects having increased design flexibility and reduced consumption of computing resources.

These and other features and advantages are provided in accordance with the present invention, which is preferably implemented with an object oriented zooming graphical user interface. The zooming graphical objects in a zooming space have attributes defined by a hierarchy of class levels. For example, an instance of a zooming object may belong to a class having at least one super class, wherein the class defines some of its characteristics, and the super class defines other characteristics. According to one aspect of the present invention, color scheme objects provide the color attributes for the graphical objects residing in the zooming space. The color scheme objects mirror the hierarchy used to define graphical objects. Specifically, class and super class level color scheme objects could correspond to the class and super class objects defining a zooming graphical object. The color scheme objects would provide the default color scheme for the given zooming object, and any other zooming graphical objects instantiated at the same class level. A class inherits the default colors of its super class(es) unless initialized or specified otherwise. Additionally, specific colors could be provided at the instance level to supercede the default color scheme. This color scheme provides increased flexibility, wherein the color scheme for a class of zooming graphical objects can be changed by merely changing the associated color scheme objects (at the class, super class, or any level that defines the class of objects).

According to another aspect of the present invention, the zooming objects and the associated color scheme objects can be simple, or complex. A simple zooming graphical object is characterized by a single operating state and a single geometric segment. For example, a rounded rectangle may be a simple zooming graphical object. A complex zooming object comprises multiple geometric segments and/or is characterized by multiple operating states. A round button comprising a rounded rectangle portion and a text portion is an example of a complex zooming object. Also, a round button (or even a simple zooming object) could have different characteristics (e.g., colors) for the rollover and selected states.

The color scheme object can implement the color description scheme of the relevant platform to define colors. For example, for Java based embodiments, a simple color scheme object contains a set of Java Colors—defining the amount of red, green and blue a color contains according to the sRGB color description system—for each of the colorable components of a simple zooming graphical object. For a simple zooming object, the colorable components might be outline color and fill color. A complex color scheme object contains a set of simple color schemes (as described above) for each geometric segment in each operating state defined by a complex object. Both types of color scheme objects are derived from a base color scheme module that defines methods and constants which are implemented by every color scheme, which facilitates run-time discovery of the color requirements for particular zooming objects.

BRIEF DESCRIPTION OF THE DRAWINGS

A better understanding of the invention, and additional objects, features and advantages of the invention, will be apparent to those skilled in the art upon reference to the following detailed description in conjunction with the accompanying drawings, in which.

DETAILED DESCRIPTION

A zooming graphical user interface according to the invention is able to display graphic representations of objects from stored information, the magnification of which representations the user is able to alter. Graphical objects may be manipulated with interactive input devices, thereby permitting the user to hone in on desired information quickly and to make efficient use of computer resources. Magnification, also know as "zooming in", displays objects in larger size and/or more detail. Reduction, also know as "zooming out", displays objects in smaller size and/or less detail. As objects are zoomed in and out, the level of detail increases and decreases causing objects to appear and disappear from view.

Figure 1:
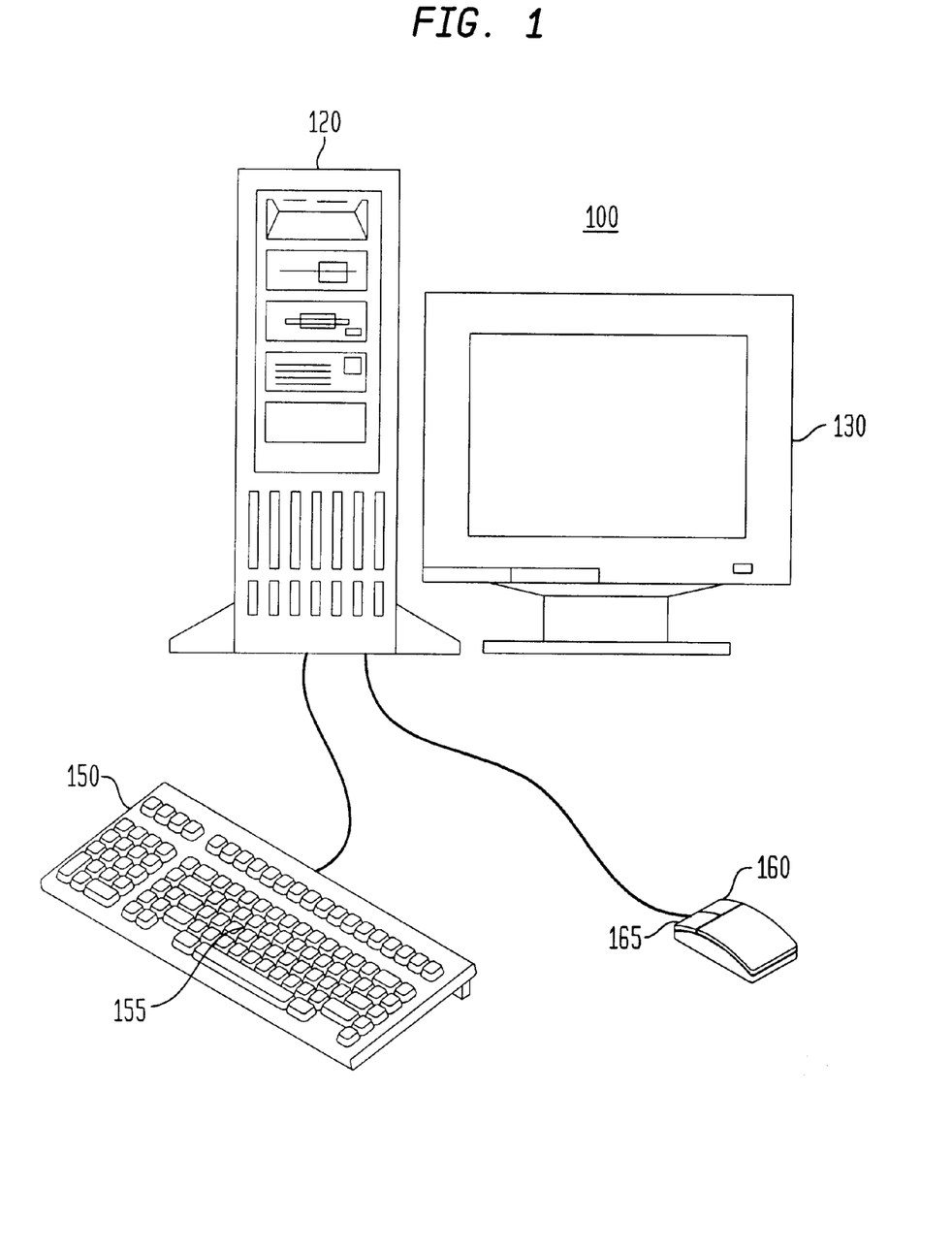
FIG. 1 is a schematic diagram illustrating a conventional computer system.

FIG. 1 illustrates an exemplary computer system 100, which is adaptable for implementing the zooming graphical interface system according to the invention. The computer system 100 includes a main housing 120 connected to a monitor 130 and interactive input devices, in this example a keyboard 150 and mouse 160, which include switches 155 and 165 having positive on and positive off positions for generating signals to the system 100. The main housing 120 includes various items (not shown in FIG. 1) that are typically used in a computer system 100. By way of example, these elements may be a processor, ROM and RAM memory, cache memory, a hard disk storage device, a floppy disk drive, a storage tape drive, graphics and audio cards, a network interface card, and a power supply, all interconnected using a conventional architecture.

A computer system 100 configured as such provides visual output through a monitor 130 and audio output through speakers (not shown), and receives input through a keyboard 150, mouse 160, and possibly a microphone (not shown). The user can interface with the computer system 100 by manipulating a viewed cursor and providing corresponding input, typically with a roller and buttons on the mouse 160. For example, the user may use the mouse 160 to move a cursor about a graphical display and position the cursor over an icon for an application on the graphical display shown on the monitor 130. The user may then double click a mouse switch 165 while the cursor is on the icon to launch the application represented by the icon (i.e., cause it to be executed). The display and functionality may be referred to as a graphical user interface.

Although the illustrated computer system 100 is of the desktop type, the invention is equally applicable to other computer system types, such as the laptop type and palm type. Additionally, although the preferred embodiment implements a mouse for moving a cursor and providing input, various technologies for accepting input and displaying output will evolve, and such evolving technologies are contemplated by the invention. For example, instead of mouse and keyboard commands, audio commands may ultimately be used to update the display. Furthermore, although a personal computer system is described in connection with this embodiment, the invention encompasses other computer system environments. For example, a set top box for a television can include a processor and memory, and can be equipped with a zooming electronic programming guide driven by the zooming engine and corresponding functionality of the invention. In such embodiments input may, for example, be received from a remote commander using infrared signals, in lieu of mouse commands. These and other alternatives will be recognized by the ordinarily skilled artisan.

Figure 2:
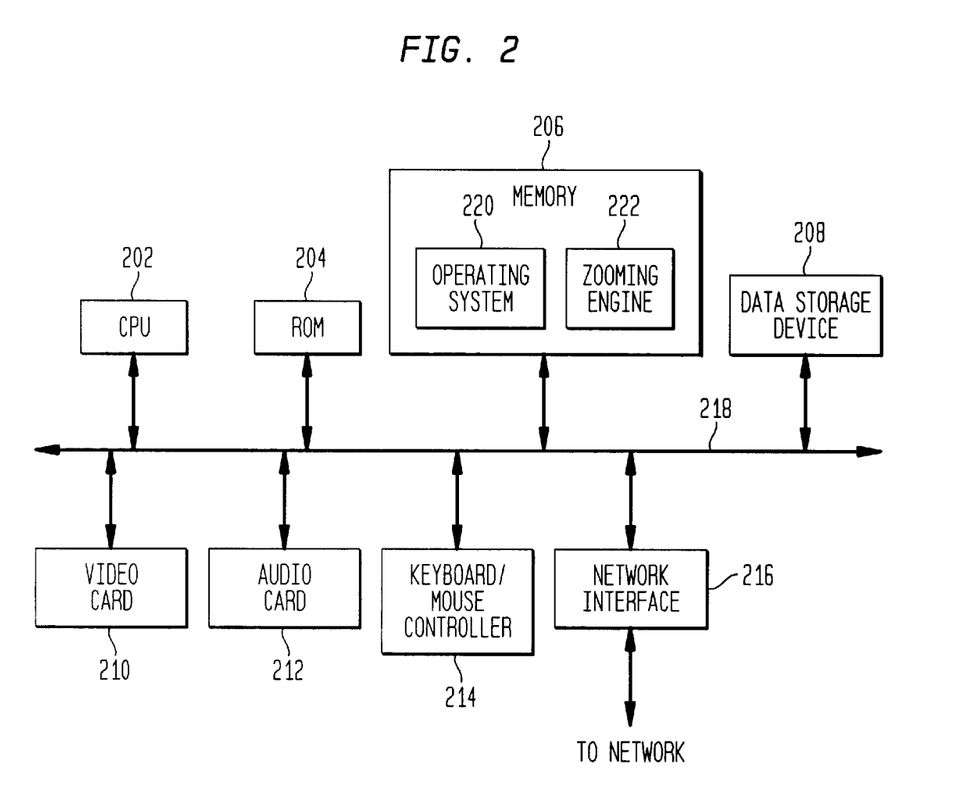
FIG. 2 is a block diagram illustrating a computer system having an embodiment of a zooming engine in accordance with the present invention.

The block diagram of FIG. 2 illustrates an embodiment of a computer 200 (the portion of the system 100 typically found in the main housing 120) to include a CPU 202, ROM 204, memory 206, data storage device 208, video card 210, audio card 212, keyboard/mouse controller 214, and network interface 216, coupled to a bus 218 in conventional fashion. The CPU 202 is a conventional processor, such as the PENTIUM™ type provided by Intel Corporation of Santa Clara, Calif. The CPU 202 executes instructions, such as those provided in ROM 204 and/or memory 206. ROM 204 is a read only memory, which retains its stored information even while it is disconnected from a power supply. The ROM 204 may, for example, store instructions for a boot up sequence. Memory 206 is preferably volatile memory for storing instructions and information used during ordinary operation, such as those provided in the computer operating system. The data storage device 208 provides long term data storage, and is preferably a magnetic or magneto-optic hard disk device. The video card 210 and audio card 212 respectively provide the interface between the computer 200 and the monitor and speakers. The keyboard mouse controller 214 interfaces the computer 200 and the keyboard and mouse that are used to provide input to the computer 200. The network interface 216 is a conventional network interface card that interfaces a local network line and the computer 200. The network interface card may be a conventional ethernet card, or may be a multipurpose interface for communication over Ethernet, ISDN and/or other networks. Access to the Internet can be provided through the network interface 216.

Of course, a computer 200 may include different items than those noted in the described embodiment. For example, I/O ports for interfacing with printers and plotters, a floppy disk drive, a CD ROM drive, and various other features may be included, and various elements may be excluded. Also, although Internet access is described in connection with a network interface card, a modem connected to a conventional phone line can be used to access the Internet, such as through an internet service provider. The ordinarily skilled artisan will recognize the various alternatives for the computer 200.

Still referring to FIG. 2, the memory 206 also includes an operating system 220 and a zooming engine 222. The operating system 220 is a program that is typically loaded from the long term data storage device 208 (e.g., hard disk) to the main memory 206 during a boot up sequence. The operating system 220 manages the other programs in the computer, which are referred to as applications, and includes particular instructions and operations that can be used by the applications, either directly or through an application program interface. The operating system 220 also handles exchanges to and from devices connected to the computer (e.g., printers, disk drives, etc.), manages memory use, and allocates computing resources in multitasking environments.

The zooming engine 222, which will be described with more particularity below, includes instructions for updating the display 130 according to user and system input, including the zooming functionality described in connection with the invention. For example, the zooming engine 222 manages the various zooming objects that may be provided in a zooming space, determines the available display space, determines which zooming objects are visible in the available view space, and responds to various events to update the display, such as mouse and keyboard events which arise in response to the user's navigation of the zooming space. Preferably, the zooming engine 222 is provided as software, although all or part of the zooming engine 222 may be provided as hardware, firmware, or a combination of software, hardware and firmware.

Figure 3:
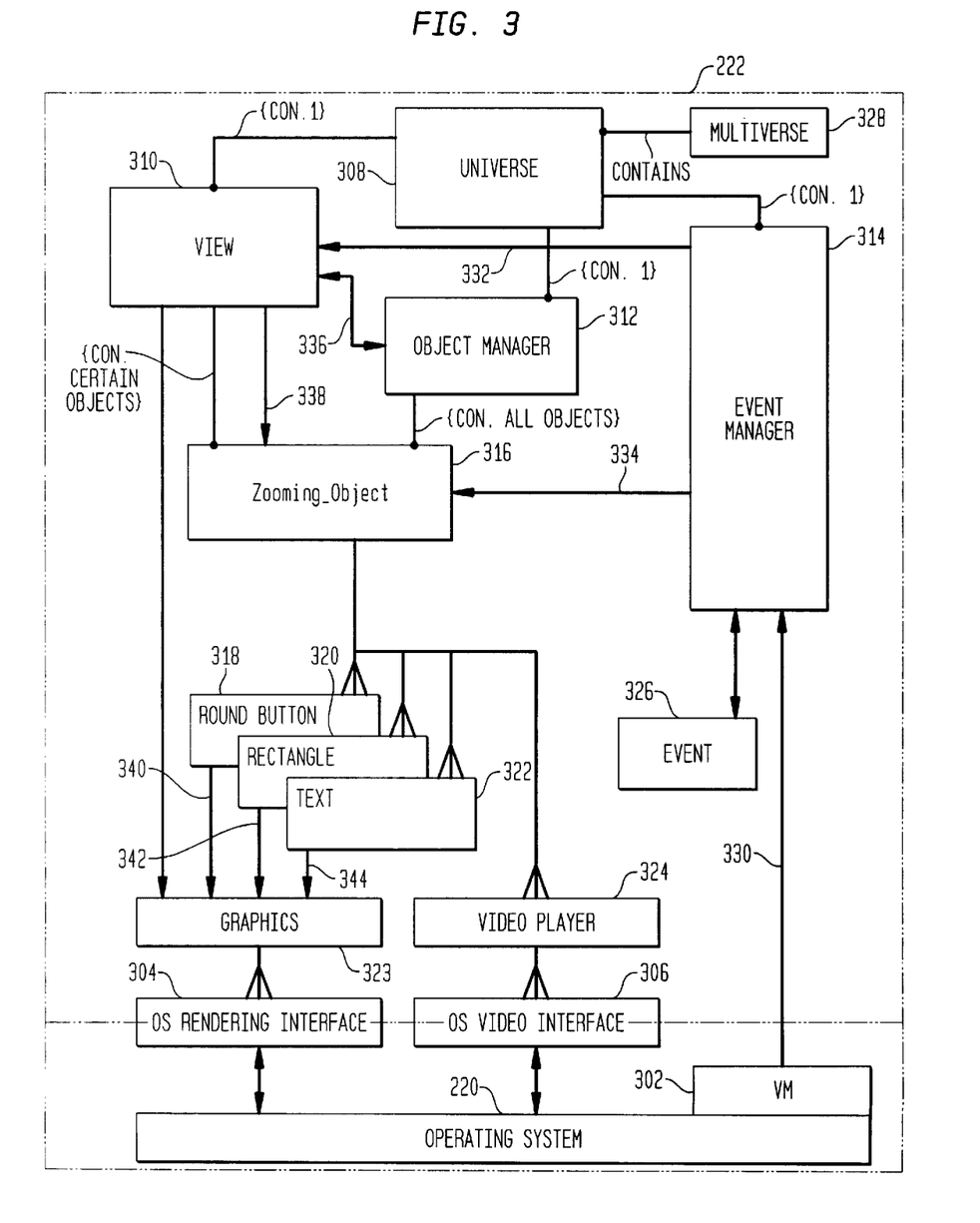
FIG. 3 is a block diagram illustrating an embodiment of a zooming engine in accordance with the present invention.

The block diagram of FIG. 3 illustrates an embodiment of a zooming engine 222. Preferably, the zooming engine 222 operates with an operating system 220, as described above, and includes various instructions which are executed by a CPU for providing the zooming graphical user interface functionality described in connection with the present invention.

Although various alternatives will be recognized once instructed according to the present invention, the preferred zooming engine 222 implements an object oriented architecture wherein multiple similar objects (such as zooming objects) can be part of the same class and inherit common functionality.

Additionally, although the zooming engine 222 may operate in any environment which facilitates the execution of instructions, including platform dependent ones, the preferred zooming engine 222 embodiment is generally platform independent, running on a virtual machine 302. The preferred zooming engine 222 embodiment is implemented in the Java® programming language and the virtual machine (VM) 302 is a Java® VM. Interfaces 304, 306 between the zooming engine 222 and operating system 220 may also be provided, such as those for rendering graphics 304 and video 306 using the operating system 220. These interfaces 304, 306 may comprise conventional facilities for interfacing with the operating system 220 such as dynamic link library (DLL) files, and/or the Microsoft DirectDraw and DirectShow SDK for the WINDOWS environment.

The zooming engine 222 includes a universe module 308 which is the highest level module corresponding to a given zooming space. The universe module 308 contains a view module 310, an object manager module 312, and an event manager module 314. These modules 308–314 each define an object class having specified characteristics and functions, and can be referred to by name (e.g., object manager 312). Also, objects corresponding to the defined class can be referred to by the name of the module. For example, objects corresponding to the view 310 can be referred to as a view object, or simply a view. In this embodiment, there is one instance of the view module 310, object manager 312, and event manager 314 for each universe 308, and each has a global point of access, similar to a singleton class definition. Of course, other embodiments can include multiple instances of these objects.

Referring again to the object manager module 312, that module controls all of the objects in a zooming space, which zooming objects are defined by the zooming object module 316 (which may be referred to as zooming_object 316), and subclasses thereof, such as round button 318, rectangle 320, text 322, and video player 324. Zooming_object 316 is the base class for zooming objects that reside in a zooming space and are displayed in a zooming view. Objects available for zooming in zooming space may include graphical objects having particular sizes, shapes and colors, complex still images, video images, or any other type of object which may be displayed within the zooming space. Image objects may be photographs provided in conventional formats such as without limitation: JPEG, GIF, BMP, FlashPix, and others. Video objects may comprise standard video such as AVI, Quicktime, MPEG, and others. Objects also may comprise input tables and forms. The above listed zooming objects and object formats are for illustrative purposes and are by no means exhaustive. Various alternative objects and object formats readily substitutable for those listed will be recognized by the ordinarily skilled artisan.

In addition, branches, such as those shown between zooming_object 316, and the further subclasses 318–324, indicate that multiple instances of each subclass may be instantiated. For example, there may be more than one round button object, with each round button object inheriting the characteristics of the super class zooming_object 316. Further, there may be multiple classes in the hierarchy. For example, zooming_object 316 could have a subclass defining attributes for all two-dimensional geometric shapes (e.g., coordojbect, not in FIG. 3), which in turn could have the rectangle 320 subclass.

The zooming engine 222 may interface with various operating systems 220. Where this is the case, the graphics module 323 interfaces the zooming engine 222 to the appropriate OS rendering interface 304. Similarly, there may be various different video player modules 324, which in turn may be ported to various operating system 220 interfaces. Alternatively, the zooming engine 222 may operate as a more pure Java® embodiment which does not require the specific rendering and video interfaces in order to operate with a particular operating system 220.

The event manager module 314 produces event objects 326 responsive to system events (arrow 330) such as mouse and keyboard events initiated by the user. The event objects 326 are then passed, along with event handling information, to the view module 310 (arrow 332) and/or the zooming_object 316 (arrow 334) so that the display can be appropriately updated.

The view module 310 contains at least one set of zooming objects selected from those in the zooming space, through request and receipt (arrow 336) of information about the zooming objects from the object manager 312. Typically, the view module 310 contains those zooming objects which reside in the main zooming view. They may be associated to the same index used by the object manager 312. This allows the various objects in a view to be separately organized in the view module 310, so that separate calls to zooming_object 316 are not required. For example, the view module 310 can issue commands (arrow 338) which are propagated through zooming_object 316 and any relevant subclass modules to render the zooming objects contained in the main zooming view.

Individual or groups of zooming objects may be separately targeted for update responsive to event information passed directly to the zooming_object 316 by the event manager 314, and rendering commands would be more directly issued by the objects, such as is depicted by arrows 340–344. An example of such an update could be a response to user selection and manipulation of a single object.

The illustrated universe module 308 and all of its submodules pertain to a single zooming space. Multiple instances of zooming spaces may be provided, as the multiverse 328 may contain numerous zooming spaces which would each comprise its own universe module 308 and appropriate submodules. All objects (instances of a class/module) are associated with a particular universe and access to variables corresponding to a particular universe is granted according to a universe identifier. In this manner, the zooming graphical user interface of the invention is able to create a unique unshared address space in a single virtual machine for each universe object and its corresponding sub-objects. Thus, a user may instantiate multiple unique zooming universes in a single virtual machine, allowing display of several unique zooming spaces at one time.

The zooming graphical objects in a zooming space have characteristics at various hierarchical levels. For example, an instance of an object from a class can have instance, class level, and super class level characteristics. According to one aspect of the present invention, color scheme objects provide the color scheme for the graphical objects residing in the zooming space. Preferably, these color scheme objects mirror the hierarchy used to define graphical objects. Specifically, continuing with the example, there would be class and super class level color scheme objects corresponding to the class and super class objects used to instantiate the given zooming object.

The color scheme objects would thus provide the default color scheme for the given zooming object, and any other zooming graphical objects instantiated at the same class level. A class inherits the default colors of its super class unless initialized or specified otherwise. Additionally, specific colors could be provided at the instance level to supercede the default color scheme. This color scheme provides increased flexibility, wherein the color scheme for a class of zooming graphical objects can be changed by merely changing the associated color scheme objects (at the class, super class, or any level which defines the class of objects), without requiring changes to each zooming object.

Additionally, zooming graphical objects may be thought of as being one of two varieties, simple or complex. A simple zooming graphical object may be defined as an object of certain geometry with no constituent segments and a single operating state, the normal operating state. Complex zooming objects comprise plural constituent elements, or may be a single element having plural operational states. Various conventional operating states may correspond to a zooming object, such as, among others, the normal, rollover, pressed, disabled, and selected operating states. The zooming object has "normal" characteristics (e.g., color) in the normal state. The rollover state may result where a cursor resides over the zooming object, the pressed state may result where the object has been selected with an input device, the disabled state may denote that the object may not be selected for further activity, and the selected state may indicate previous user interaction with the object. Each of these states may use a different color scheme.

For complex zooming objects, each geometric segment forming the object could be characterized by a unique fill color and outline color corresponding to each possible operating state of the button. A button formed by a rounded rectangle segment defining the geometric size/shape of the button and a textual label segment of a certain size/shape positioned in the rounded rectangle segment is an example of a complex zooming object. Further complexity could be associated with a button by characterizing a multitude of operating states, as discussed above, that are invoked by user interaction with the displayed zooming object. For instance, a zooming button could be displayed for a first operating state as a white rounded rectangle segment with black outline and a white label segment with black outline.

Figure 4:
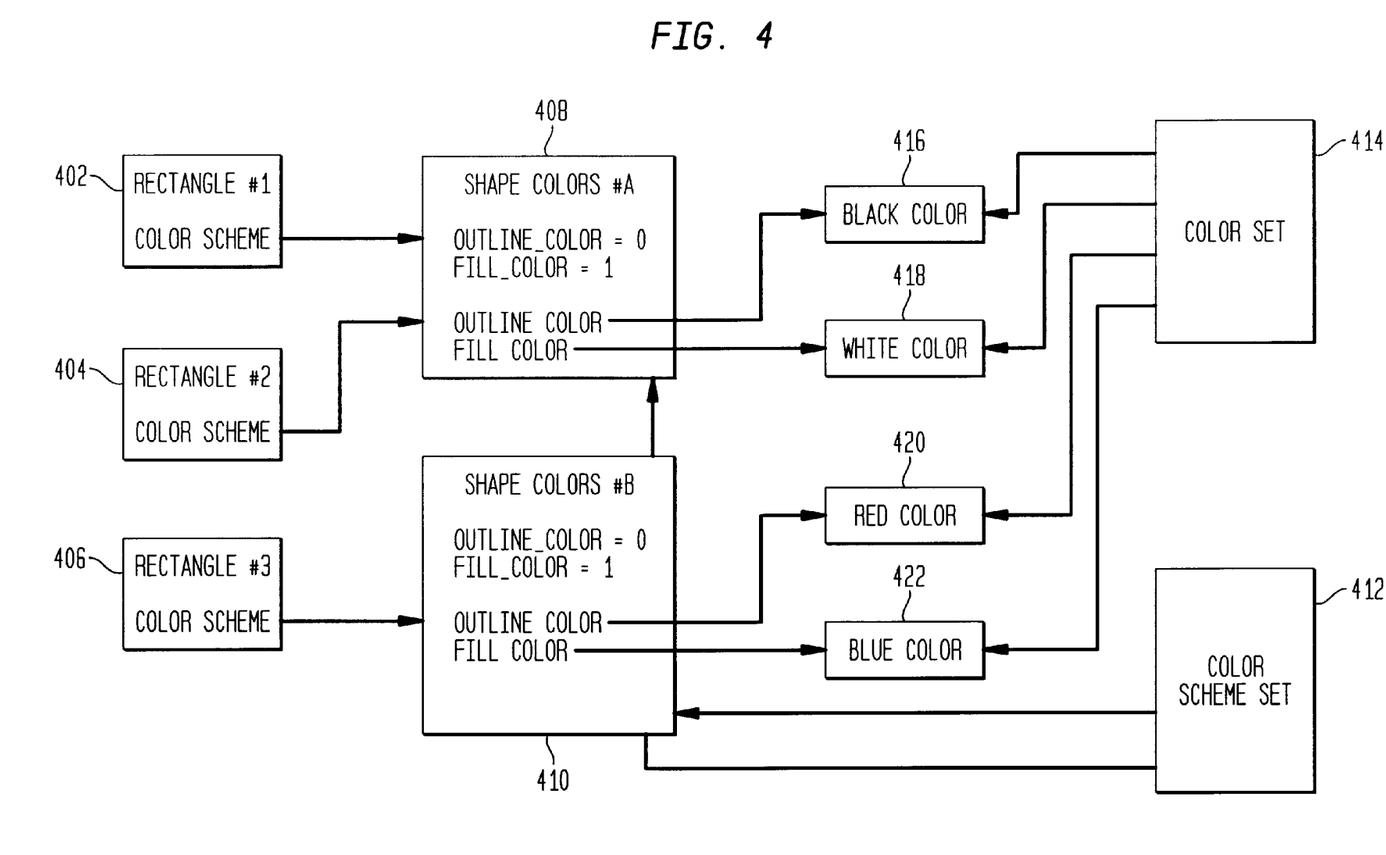
FIG. 4 is a block diagram illustrating an embodiment of the association between a zooming object and a simple color scheme in accordance with the present invention.

FIG. 4 schematically depicts an illustrative example of zooming graphical objects associated with a simple color scheme in accordance with the invention. A simple color scheme contains a set of Java Colors for the "colorable" component of a simple zooming graphical object. In FIG. 4, three simple zooming graphical objects are illustrated, namely rectangle#1 402, rectangle#2 404, and rectangle#3 406. Each rectangle object, rectangle#1 402 for example, is an instance of the zooming object class rectangle 320, which contains methods and attributes that define the basic behavior and geometry of rectangles. Zooming objects are also characterized by color scheme objects, which mirror the hierarchy and containment of the zooming objects they characterize. In this example, the rectangle zooming objects 402–406 are shown to be simple objects lacking special operating states, or plural constituent segments.

The class rectangle thus has a corresponding class of color scheme objects according to the same hierarchy. Here, the class rectangle has a corresponding color scheme class denoted Shape Colors #A. Shape Colors #A provides the default color scheme used for all instances of rectangle. There may be additional associations which do not need to be shown for an understanding of the invention. For example, where the class rectangle has a super class "coordobject" that defines the characteristics for all two dimensional geometrical shapes (e.g., triangles, circles, rectangles), then each instance of a rectangle could have corresponding color scheme objects at the "rectangle" level as well as at the "coordobject" level (and zooming_object level).

Each instance of an object has a color scheme that may be initialized and updated. The zooming object implements its default color scheme unless an instance color scheme is specified. In FIG. 4, rectangle #1 (402) and rectangle #2 (404) implement the default color scheme Shape Colors #A (408) for rectangles, while rectangle #3 (406) implements instance color scheme Shape Colors #B (410). The instance level color scheme may be an instance of the default color scheme object, with exceptions for the instance.

Shapecolors#A 408 and shapecolors#B 410 are color scheme objects. In this case, the rectangles are simple objects having a certain size/shape and a single operating state. The color scheme objects characterize the 'colorable' components for the operating states of a zooming object, here a single outline color and a fill color. Colorschemeset 412 references the instance level color schemes, such as Shape Colors #B, preferably via a hash table. Colorset 414 provides access via a hash table to color objects 416–422, which define RGB values necessary to produce a unique color on the display during the rendering of objects in the zooming space. Black color 416, white color 418, red color 420 and blue color 422 may be referenced by a color scheme to provide the color for the colorable components for its zooming graphical object. For example, the outline color for shapecolors#A is black as defined by black color 416. Providing access to color objects 416–422 through colorset 414, and separately referencing the specified colors from color scheme objects associated with zooming graphical objects provides more efficient storage of color information. This arrangement also allows easier updates, since instance level color schemes can be invoked, and since the color references within existing color scheme objects can be easily changed to change the corresponding color schemes.

Figure 5:
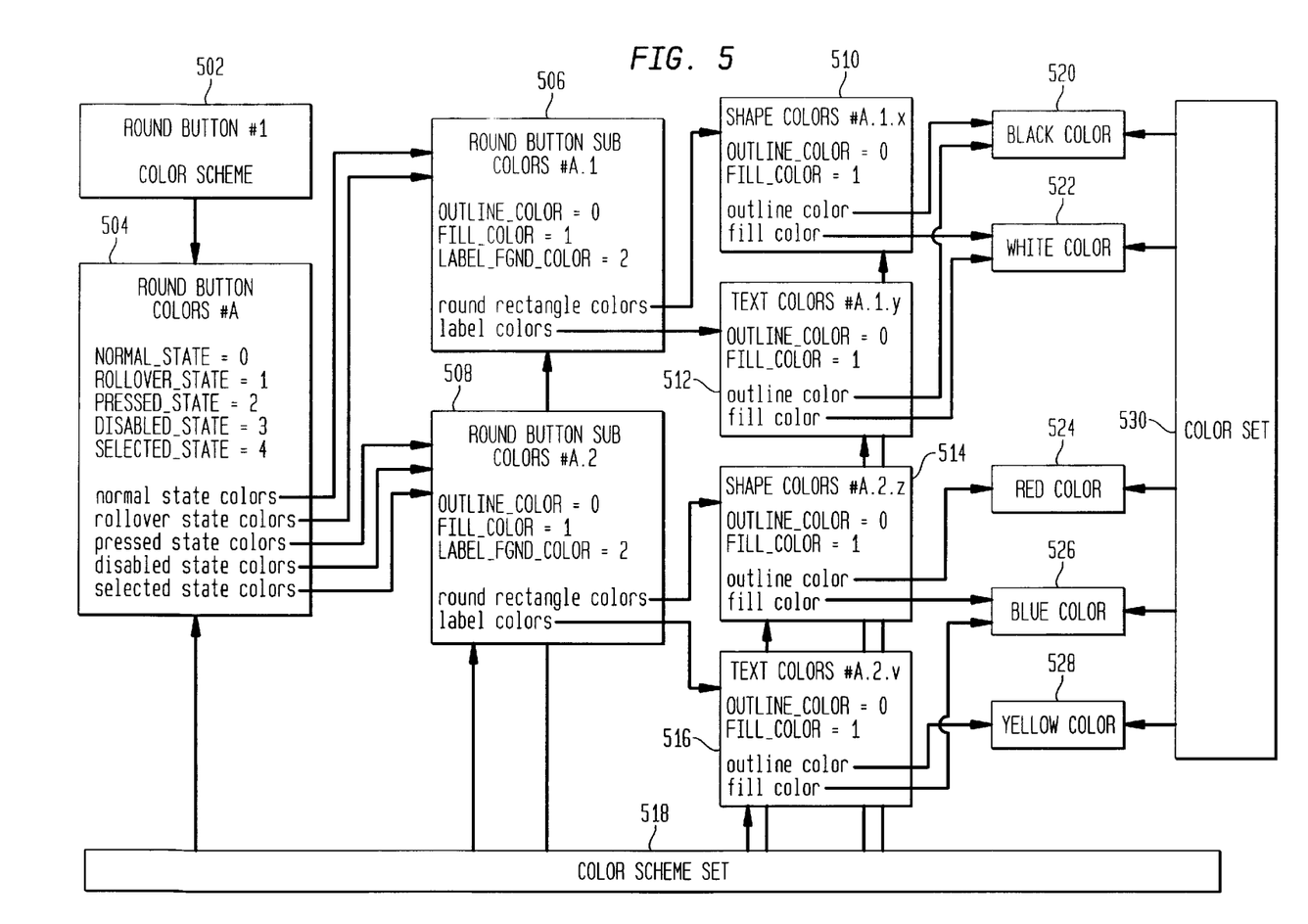
FIG. 5 is a block diagram illustrating an embodiment of the association between a zooming object and a composite color scheme in accordance with the present invention.

FIG. 5 schematically depicts an example of a zooming graphical object associated with a composite color scheme in accordance with the invention. Color scheme objects characterize zooming objects and mirror their hierarchy and containment. Complex objects may be a zooming object having multiple operating states, or a composite object comprising plural constituent portions or segments. Thus, a complex zooming graphical object is characterized by a composite color scheme containing a set of simple color scheme objects for each constituent of the object under each the object's operating states. In FIG. 5, the color scheme for a complex zooming graphical object, roundbutton#1 502, is illustrated. Each round button object, roundbutton#1 502 for example, is an instance of roundbutton 318, which contains methods and attributes that define the basic behavior and geometry of round buttons. Since roundbutton#1 502 is a complex zooming object, it is associated with a composite color scheme.

The color scheme object for a composite color scheme is comprised of several portions which allow an outline color and a fill color to be set for each of an object's geometric segments under all operating states. A first portion defines attributes for each operating state of a zooming object and is associated to an operating state with a second portion, which defines further attributes that mirror the colorable segments of the object. In the example of FIG. 5, roundbutton#1 502 has multiple operating states and is comprised of a rounded rectangle segment and a text label segment. As shown, the first portion of a composite color scheme object, here roundbuttoncolors#A 504, contains variables that can be set to associate an operating state with further portions of the composite color scheme for cuing the normal, rollover, pressed, disabled and selected operational states. For example, the disabled state is shown associated with roundbuttonsubcolors#A.2 508.

The second portion of the color scheme contains variables which permit each constituent geometric segment of the zooming object to be associated with a third portion, which defines further attributes for associating an outline color and fill color to a color object. As shown Roundbuttonsubcolors#A.1 506 and roundbuttonsubcolors#A.2 508 have attributes that allow color objects to be associated with a rounded rectangle segment and a label segment. For example, shapecolors#A.2.z 514 and textcolors#A.2.v 516 define an outline color and a fill color for the round rectangle and the text label respectively of roundbuttonsubcolors#A.2 508. As shown shapecolors#A.2.z 514 has the red color object associated with its rounded rectangle segment and the blue color object associated with its label segment. Other outline color and fill colors for geometric segments of a zooming object may be defined as shown by shapecolors#A.1.x 510 and textcolors#A.1.y 512.

In this manner, the disabled state is associated collectively with roundbuttoncolors#A.2 504, roundbuttonsubcolors#A.2 508, shapecolors#A.2.z 514 and textcolors#A.2.v 516. This combination constitutes a color scheme object that mirrors the hierarchy and containment of the button zooming object. The color scheme object is stored as a sub-array element of an array of arrays by colorschemeset 518, which provides access to color schemes via a hash table.

Colorset object 530 provides access via a hash table to color objects 520–528, which define the RGB values necessary to produce a unique color on the display during the rendering of objects on the zooming space. Black color object 520, white color object 522, red color object 524, blue color object 526 and yellow color object 528 may be referenced by the color scheme object to provide the color for the colorable elements of the zooming graphical object. For example, textcolors#A.2.v 516 is characterized by a yellow outline color as defined by the yellow color object 528 and a blue fill color as defined by the blue color object 526.

Roundbutton#1 502 will be displayed as a blue rounded rectangle with red outline having a blue label with yellow outline for the disabled state. In a similar manner, color may be characterized for each geometric segment of an object for each operating state of the object. Naturally, a zooming object may have any practical number of operational states or geometric segments. A color scheme object for such a zooming object would have a corresponding number of attributes allowing color to be associated with each geometric segment for each operating state.

Figure 6:
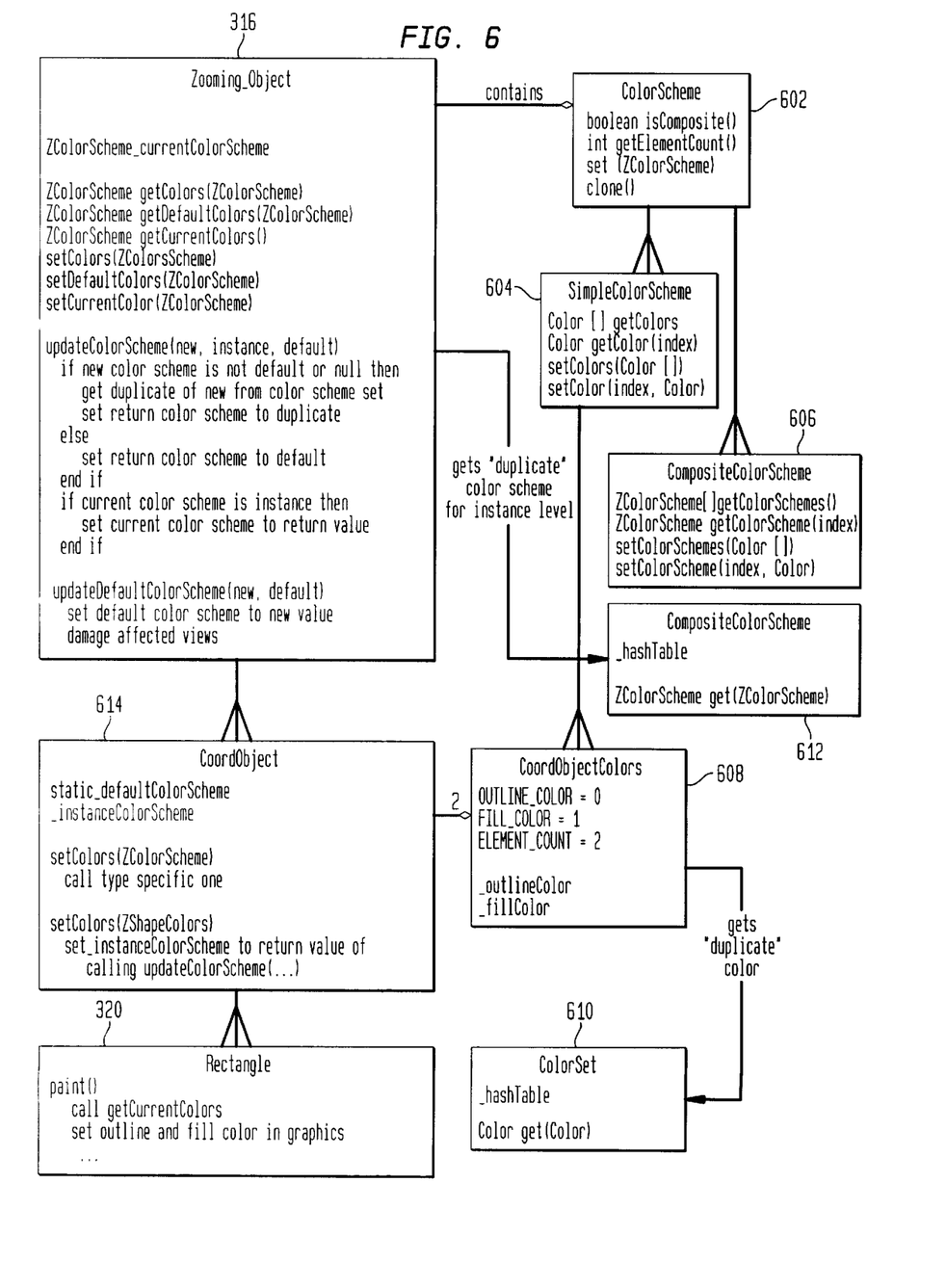
FIGS. 6 and 7 are respectively a block diagram and flow diagram illustrating an embodiment of an architecture and method for zooming object color processing in accordance with the present invention.
Figure 7:
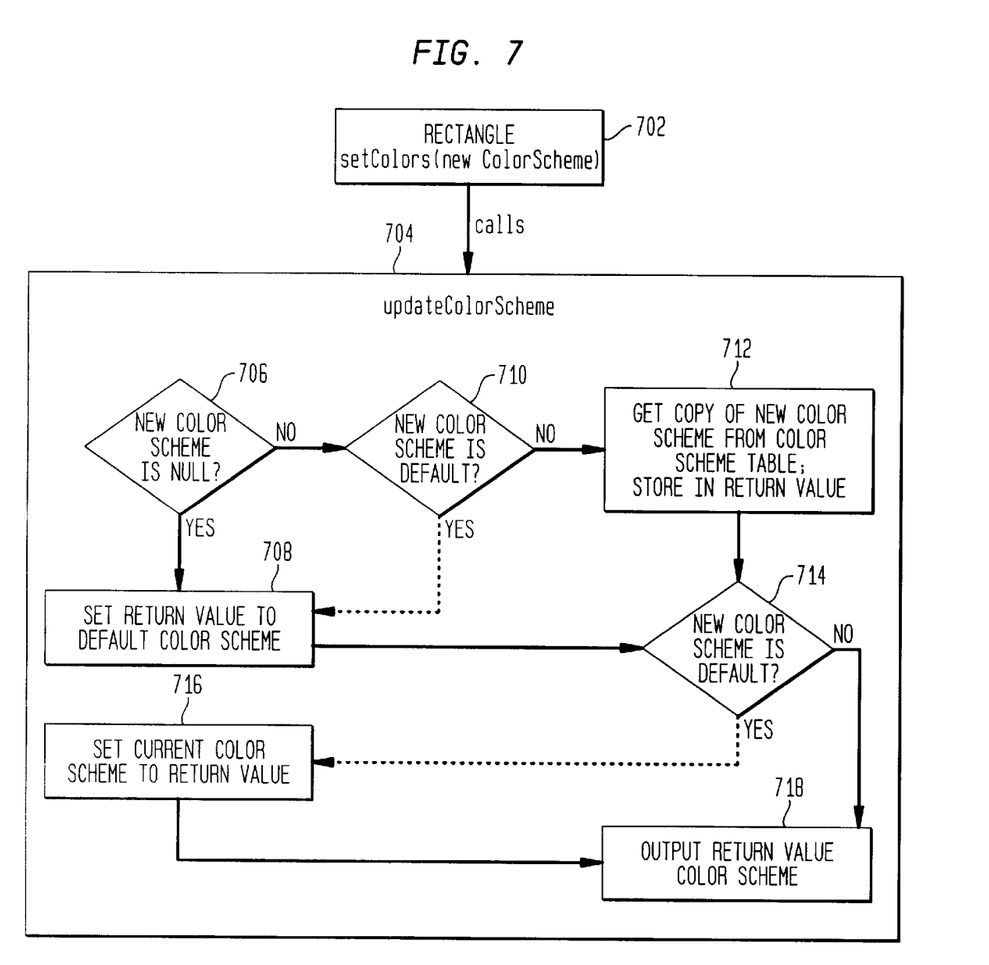

Referring to the block diagram of FIG. 6 and the flow diagram of FIG. 7, an embodiment of object color processing is now described. Turning first to FIG. 6, a block diagram illustrating the architecture for object color processing illustrates the association of the zooming_object 316 to various other modules 320, 602–614. Specifically, various color processing modules 602–612, the rectangle 320 class of zooming objects, and the coordobject class 614 are shown. A rectangle is an instance of the class of rectangle 320 objects, which is a subclass of coordobject 614 objects, which is a subclass of the base class of objects zooming_object 316. Among the attributes provided by zooming_object 316 are those for associating a zooming object with a color scheme. Zooming_object 316 also contains a set of methods for variously manipulating (e.g., getting, setting, and updating) color schemes for a given zooming object. These methods apply only to colorable objects and provide an error ("throw an exception") if they are called on an object that cannot be colored.

As described above, the color scheme objects mirror the hierarchy and containment of their corresponding zooming objects. Particularly, simplecolorscheme 604 and compositecolorscheme 606 respectively define the color attributes for simple and complex zooming objects. Colorscheme 602 provides basic attributes inherited by all color schemes and organizes the association of simple zooming objects to simple color scheme objects, and complex zooming objects to composite color schemes. Simplecolorscheme 604 provides default color attributes for all simple zooming objects (including constituent segments of complex zooming objects). Coordobjectcolors 608 is an instance of simplecolorscheme 604, and defines additional default color attributes pertaining to the coordobject class 614 of zooming objects, as well as any subclasses to coordobject 614, such as the illustrated rectangle class 320.

Preferably, default color attributes are provided along the class hierarchy, and are implemented unless specified otherwise. Thus, for a simple zooming object simplecolorscheme 604 provides default attributes corresponding to the base zooming_object 316 level, coordobjectcolors 608 provides additional default attributes corresponding to the coordobject 614 level, and additional color attributes could be defined for each rectangle instantiated as a rectangle object 320. A class inherits the default colors of its super class unless specified otherwise. Thus, for an instance of a rectangle one would look to the color attributes defined by colorscheme, then coordobjectcolors, and then any attributes provided at the instance level. Although default color schemes are shown for only the zooming_object 316 and coordobject 614 level, the rectangle class 320 may also have a corresponding default color scheme.

Still referring to FIG. 6, coordobject 614 defines all two dimensional geometrical shapes, and coordobjectcolors 608 provides the default attributes for all such shapes. Particularly, it may specify the outline and fill colors for each shape in the class. Colorset 610 accesses color objects (not shown in FIG. 6) indexed by RGB values that define specific display colors. Finally, colorschemeset 612 stores references to instance level colors schemes so that, as necessary, these color schemes can be retrieved and duplicated when new instances of relevant objects are created. Compositecolorscheme 606 provides a set of simple color schemes that collectively provide the color attributes for a complex zooming object, as previously described in connection with FIG. 5.

In order to allow for the run-time discovery of a graphical zooming object's color requirements, and the status of the color attributes of a particular object, the colorscheme module 602 defines a number of methods and constants inherited by every color scheme. These methods include (1) a method permitting recursive discovery of whether a color scheme is simple or complex, (2) a method that returns the number of component colors or sub color schemes contained in a color scheme, (3) a method that returns all of the component colors or sub color schemes of a color scheme in an array, and (4) a method to set any component color or sub color scheme of a color scheme based on an identifying index. When the latter ("set") method is invoked, it gets an equivalent color or color scheme from the appropriate set, which enables the original instance to be freed, manually or through garbage collection, and ensures that a minimal amount of memory is used.

FIG. 7 shows, in flow diagram format, an embodiment of a method for processing the color attributes for an object in accordance with the invention. At step 702, a zooming graphical object, for instance, a rectangle zooming object 320, calls a "setColors" method and passes a color scheme object as the sole input parameter. At step 704, the rectangle object's called method in turn calls the "updateColorScheme" method defined by the zooming_object 316. In determination step 706, the method determines if the new color scheme is set to the null object. If the new color scheme is set to the null object, the method sets a return value to the default color scheme at process step 708. If the new color scheme is not set to the null object, the method determines whether the new color scheme is the default object at determination step 710. If the new color scheme is the default object, the return value is set to the default color scheme at process step 708. If the new color scheme is not the default object, a copy of the new color scheme is obtained via the colorschemeset hash table and stored in the return value at process step 712. Proceeding from either process steps 708 or 712, the method advances to determination step 714 where it is again determined if the new color scheme is the default object. If the new color scheme is determined to be the default object at step 714, the current color scheme is set to the return value at process step 716. If it is determined that the new color scheme is not the default object at step 714 or after the completion of process step 716, the return value color scheme is output and control returns to the calling method at process step 718.

Figure 8A:
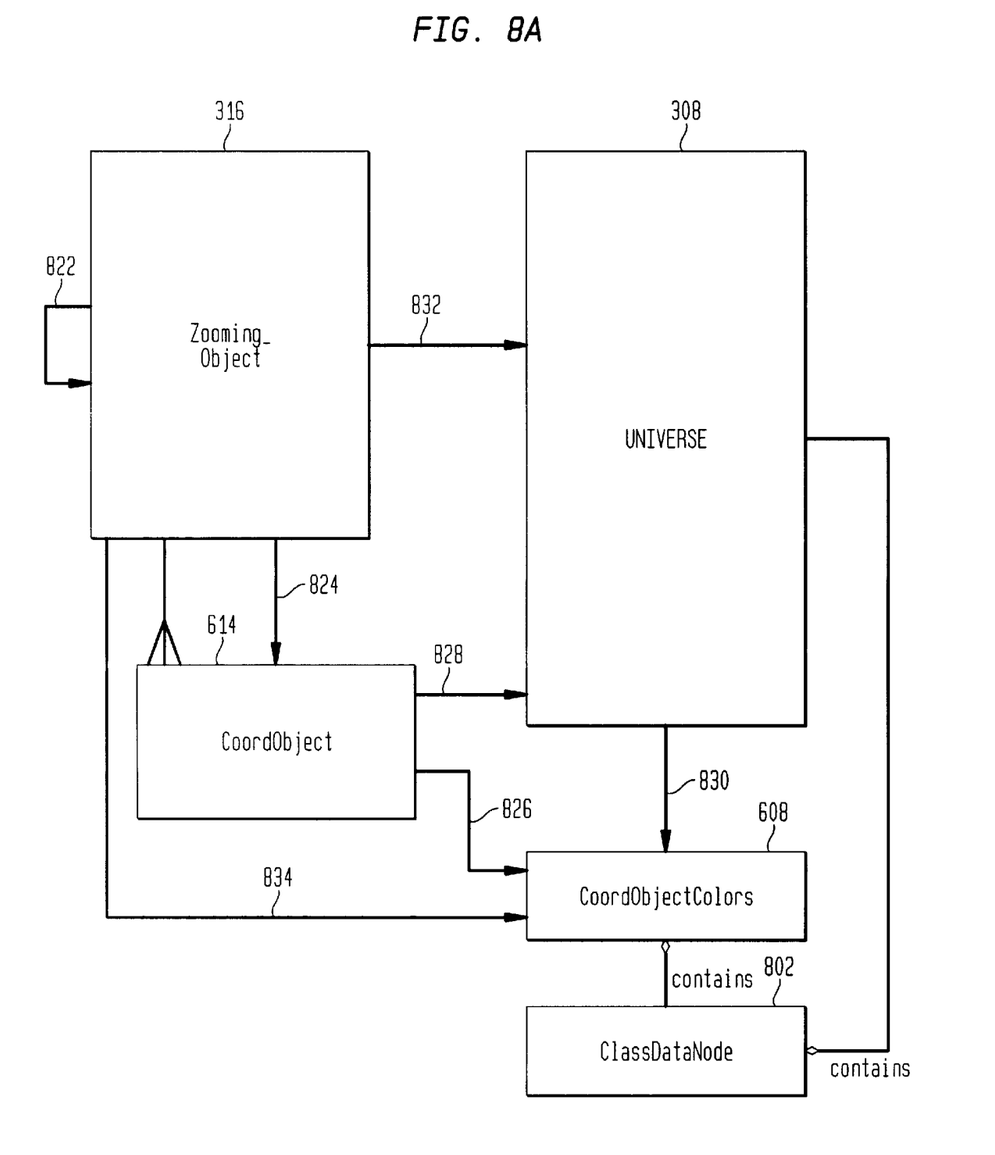
FIGS. 8A and 8B are flow diagrams which respectively illustrate initializing a color scheme and updating an instance color scheme for another embodiment of an architecture and method for zooming object color processing in accordance with the invention.
Figure 8B:
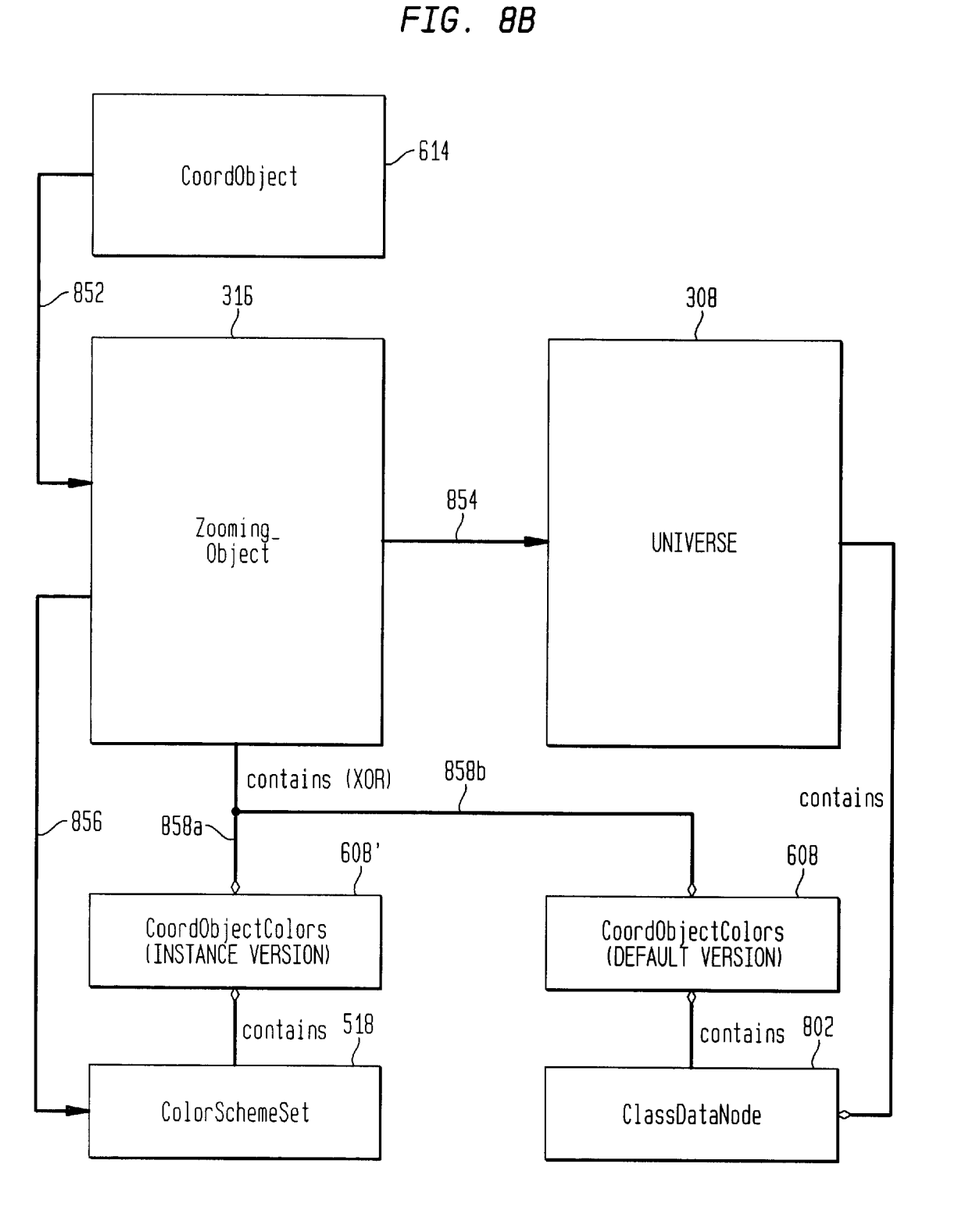

Referring now to the architectural flow diagrams of FIGS. 8A and 8B another embodiment of the architecture and method for zooming object color processing is now described. Particularly, the flow diagram of FIG. 8A illustrates the architecture and method for initializing a color scheme according to this embodiment.

As previously described, the universe module 308 is the highest level module for a zooming space, and various objects can be associated with a universe 308 from which they can access variables and other information. In FIG. 8A, the universe module 308 is also shown to contain a classdatanode 802, each of which contains information for its particular classes of objects, such as the color scheme corresponding to the particular class. Zooming_object 316 is the base class for zooming objects, and coordobject 614 defines attributes for two-dimensional geometrical shapes. It may also have subclasses such as rectangle (not shown in FIG. 8A).

The hierarchy of color scheme objects mirrors the hierarchy for zooming objects. Particularly, color scheme attributes are available for inheritance by objects at the zooming object 316 and coordobject 614 level (and can also be available at the rectangle level, and so on). For a simple zooming object, these color scheme attributes are respectively defined by simplecolorscheme 604 (not shown in FIG. 8A) and coordobjectcolors 608. Color attributes for an object can be specified at the instance level, and default color attributes can be specified at the class and super class levels. Preferably, the zooming object implements color schemes by default, starting with the highest (root, or base) level color scheme and moving down the chain of hierarchy to the instance level. Each default color scheme is adopted unless specified otherwise. That is, if the rectangle class of zooming objects did not implement a rectangle class level color scheme object, then it would by default inherit the coordobjectcolor 608 and simplecolorscheme 604 color attributes absent a contrary specification along the hierarchical chain. Any class in the zooming object hierarchy can implement a color scheme object at the analogous level (e.g., the rectangle class could implement a "rectanglecolor" object (not shown)).

FIG. 8A illustrates the initialization of a color scheme for the coordobject 614 class of objects. Zooming_object 316 includes a method for installing class data (step 822), including the color attributes. This calls (step 824) a method for installing default colors contained in coordobject 614, which responds by creating (step 826) a new default instance of the color scheme coordobjectcolors 608 and calling (step 828) a method for setting default colors contained in the universe module 308. To set the default colors, this method indicates the new color scheme in an existing class data node, or creates a new class data node having such indication. The indication of the color scheme may be stored as a reference (denoted by arrow 830) to the color scheme. Once the update has been established, zooming_object 316 calls a method for getting default colors provided in the universe module 308, which retrieves the class data node for the relevant type of object (e.g., stored in a table), and returns the color scheme. After initialization, a default color scheme can be updated by voiding the previously set default color scheme, and then calling the method in the universe module 308 for setting default colors, which copies the new color scheme to the previously established (at initialization) class data node.

Referring now to the architectural flow diagram of FIG. 8B, an update of an instance color scheme according to this embodiment of the present invention illustrates the various elements shown in FIG. 8A, with the addition of colorschemeset 518, which contains references to the various instance level color schemes, as described above. Coordobject 614 calls a method (step 852) in zooming object 316 for setting colors, which initially calls a method (step 854) found in universe 308 for getting the current default color scheme for the relevant class. Specifically, this method retrieves the class data node for the relevant class of objects, and returns the corresponding default color scheme in the node. If the updated color scheme is not default (i.e., it is instance), then zooming_object 316 calls a method (step 856) in colorschemeset 518, which returns a reference to the table entry that is identical to the given color scheme. In step 858, the reference to the appropriate color scheme is updated. For the instance color scheme, zooming_object 316 uses the reference returned by colorschemeset 518 to reference the updated instance version of coordobjectcolors 608', as shown in step 858a. If a default color scheme is used, zooming_object 316 references the default version of coordobjectcolors 608, as shown in step 858b.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. For implementation with an object oriented graphical user interface, a method for providing color attributes for graphical objects to be displayed by the graphical user interface, the method comprising:

defining attributes for a first graphical object according to a plurality of graphical object classes including a first class of graphical objects and a second class of graphical objects that is a subclass of the first class of graphical objects, the first graphical object being a member of the second class of graphical objects;

providing a plurality of color scheme objects having a second class hierarchy that mirrors a first class hierarchy, the first class of graphical objects having a corresponding first class of color scheme objects that provides a first default color scheme for graphical objects belonging to the first class of graphical objects, the first default color scheme being inherited by members of the second class of graphical objects, and the second class of graphical objects having a corresponding second class of color scheme objects that provides a second default color scheme for graphical objects belonging to the second class of graphical objects; and determining the color attributes for the first graphical object by using the plurality of color scheme objects.

2. The method of claim 1, wherein the first graphical object inherits the first default color scheme.

3. The method of claim 1, wherein the first graphical object has an instance color scheme that differs from the first default color scheme.

4. The method of claim 1, wherein the first graphical object inherits the second default color scheme.

5. The method of claim 1, wherein the first graphical object is a rectangle, the second class of graphical objects defines attributes for two dimensional geometric shapes, and the first class of graphical objects is a base class for all graphical objects.

6. The method of claim 1, wherein the first graphical object has an instance color scheme that differs from the second default color scheme.

7. The method of claim 1, wherein the first graphical object includes a first operating state and a second operating state, the first graphical object being associated with a first color scheme object for the first operating state and a second color scheme object for the second operating state, whereby providing different color characteristics for the first and second operating states are provided.

8. The method of claim 1, wherein the first graphical object comprises plural constituent segments, and the hierarchy and containment of the first graphical object are mirrored by the hierarchy and containment of the color scheme objects corresponding to the first graphical object.

9. The method of claim 1, wherein the first graphical object is a zooming object and the graphical user interface is a zooming graphical user interface.

10. The method of claim 1, wherein the first class of color scheme objects defines attributes that are implemented by every color scheme, which allows run time discovery of color attributes.

11. An object oriented zooming engine for providing a graphical user interface having graphical objects displayed by the graphical user interface according to color attributes, the object oriented zooming engine comprising:

a plurality of graphical object classes having a first class hierarchy, the plurality of graphical object classes defining attributes for a first graphical object, the plurality of graphical object classes including a first class of graphical objects and a second class of graphical objects that is a subclass of the first class of graphical objects, the first graphical object being a member of the second class of graphical objects, the first class of graphical objects having a corresponding first class of color scheme objects that provides a first default color scheme for graphical objects belonging to the first class, the first default color scheme being inherited by at least some members of the second class of graphical objects, and the second class of graphical objects having a corresponding second class of color scheme objects that provides a second default color scheme for graphical objects belonging to the second class; and a plurality of color scheme object classes having a second class hierarchy that mirrors the first class hierarchy, the plurality of color scheme object classes being used to determine the color attributes for the first graphical object.

12. The zooming engine of claim 11, wherein the first graphical object inherits the second default color scheme.

13. The zooming engine of claim 11, wherein the first graphical object is a rectangle, the second class of graphical objects defines the attributes for two dimensional geometric shapes, and the first class of graphical objects is a base class for all graphical objects.

14. The zooming engine of 11, wherein the first graphical object has an instance color scheme that differs from the second default color scheme.

15. The zooming engine of claim 11 wherein the corresponding first class of color scheme objects defines the attributes that are implemented by every color scheme, which allows run time discovery of the color attributes.

* * * * *